3,775,327
Patented Nov. 27, 1973

3,775,327
DISPERSIONS CONTAINING POLYESTERS WITH TERMINAL POLYHYDROXYL GROUPS
Darrell R. Thompson, Somerville, N.J., assignor to E. I. du Pont de Nemours and Company, Wilmington, Del.
No Drawing. Continuation-in-part of abandoned application Ser. No. 776,774, Nov. 18, 1968. This application Apr. 12, 1971, Ser. No. 133,422
Int. Cl. C08g 51/28; H01f 1/28
U.S. Cl. 252—62.54                                12 Claims

ABSTRACT OF THE DISCLOSURE

Dispersions of particles in organic liquids, containing, as anti-flocculating agents, polyesters represented by the general structure $$AZ\left[OX\overset{O}{\underset{\parallel}{C}}\right]_n OD$$

CROSS-REFERENCE TO RELATED APPLICATIONS

This application is a continuation-in-part of application Ser. No. 776,774, filed Nov. 18, 1968, now abandoned.

STATEMENT OF THE INVENTION

This invention is directed to novel dispersions. It is more particularly directed to novel dispersions comprising (a) an organic liquid, (b) particles dispersed in the liquid and (c) as an anti-flocculating agent, molecules of a polyester represented by the structure $$AZ\left[OX\overset{O}{\underset{\parallel}{C}}\right]_n OD \quad (1)$$

where

A is a radical bearing at least two hydroxyl groups, such as $$HOCH_2-\overset{H}{\underset{OH}{C}}-CH_2-, \quad HOCH_2\overset{H}{\underset{OH}{C}}-CH_2OCH_2\overset{H}{\underset{OH}{C}}-CH_2-,$$

$$\overset{HOCH_2}{\underset{HOCH_2}{\diagdown}}C-CH_2-, \quad \overset{HOCH_2}{\underset{HOCH_2}{\diagdown}}C-\overset{H}{\underset{H}{C}}-O-\overset{H}{\underset{H}{C}}-\overset{CH_2OH}{\underset{CH_2OH}{C}}-CH_2-,$$

$$HO\underset{HO}{\overset{HO\quad OH}{\diagup}}\hspace{-2pt}\langle S\rangle\hspace{-2pt}\underset{OH}{\diagdown}, \quad HOCH_2\overset{H}{\underset{OH}{C}}\hspace{-2pt}\left(CH_2\right)_4\hspace{-2pt};$$

$$\overset{HOCH_2}{\underset{HOCH_2}{\diagdown}}C-CH_2-, \quad H\hspace{-2pt}\left[\overset{H}{\underset{CH_2OH}{C}}-CH_2\right]_{3-20}$$

and $$H\left[\overset{}{\underset{OH}{CH}}-CH_2\right]_{3-50}$$

Z is an organic linking radical;
X is an alkylene radical of 2 through 18 carbon atoms;
D is hydrogen or an alkyl radical of 1 through 18 carbon atoms; and
n is a number 10 through 500.

Utility

The dispersions of the invention are highly resistant to flocculation. This makes them especially useful in preparing coating compositions.

For example, stable organosols of organic polymers such as polyvinyl chloride
polyvinyl fluoride
polyvinylidene chloride
polyvinylidene fluoride, and
polymers of acrylic- and methacrylic acids and their amides, nitriles and esters with alkanols of 1 through 18 carbon atoms, prepared according to the invention, can in turn be used to prepare coating compositions in which these polymers are the film-forming components.

The particles in the dispersions of the invention can also be pigment particles. Illustrative of the pigments which can be used are titanium dioxide, carbon black, zinc oxide, lead titanate, potassium titanate, antimony oxide, lithopone, phthalocyanine blue, toluidene red, quinacridone and the like.

The pigment dispersions of the invention are remarkably resistant to flocculation, which gives the paints into which these dispersions are incorporated higher initial gloss, better hiding and tinting strength and makes them resistant to color drift and gloss loss. These pigment disperions can also be used satisfactorily with many more diverse types of paints than conventional pigment dispersions. Furthermore, a pigment dispersion of the invention can have a significantly higher pigment content, while retaining the same degree of fluidity, than when a conventional aid is used.

Magnetic oxides such as iron oxide and chromium dioxide can also be the particulate matter in the dispersions. Such compositions are useful for preparing magnetic tape.

Dispersions containing 40% to 80%, by weight, of a magnetic oxide and 0.5–10%, by weight, of a material of Formula 1 show improved adhesion to the tape and improve the tape's electrical properties.

Preferred for these uses are dispersions shown in the examples.

Preparation of the anti-flocculating agents

Preparation of the anti-flocculating agents can be more easily shown if it is first explained that structurally the polymer molecule divides itself naturally into three segments.

The first of these, the A segment, is derived from a polyhydroxy compound.

The second, the —Z— segment, is an organic linking radical which serves only to link the other two segments of the molecule together.

The third, the $$\left[-O-X-\overset{O}{\underset{\parallel}{C}}\right]_n OD$$

segment, is derived from a polyester.

The polyhydroxy and polyester segments are separately prepared and then linked together through a suitable linking reactant to form the polymers of the invention.

Illustrative of the polyhydroxy compounds suitable for use are glycerol, pentaerythritol, diglycerol, dipentaerythritol, inositol, trimethylol propane, trimethylol ethane, butanetetrol, hexanehexitol, polyallyl alcohol and polyvinyl alcohol.

The polyester segment can be prepared by any of the well-known polyester forming reactions. Illustrative of these are (1) polymerization of lactones such as propiolactone, caprolactone and pivalolactone, and
(2) condensation of hydroxy acids such as α,ω-hydroxypropionic acid, α,ω-hydroxydecanoic acid and 12-hydroxystearic acid.

These reactions, as well as others, are described in greater detail in "Preparative Methods of Polymer Chemistry," Sorenson and Campbell, Interscience Publishers, Inc. New York, N.Y. (1961), pp. 111–127 and 242–247, and "Polyesters and Their Applications," Bjorksten Research Laboratories, Inc., Reinhold Publishing Corp., New York, N.Y. (1956).

The polyester segment must then be modified so that it can be linked to the polyhydroxy segment. An illustrative modifying reaction (which introduces a linking radical, Z, into the final polymer molecule) is

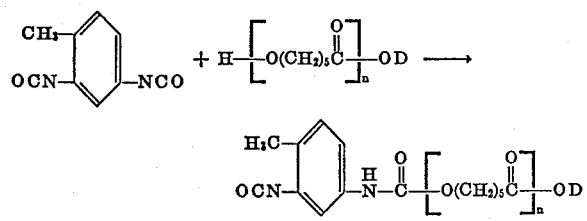

In this reaction, stoichiometric quantities of the reactants are dissolved in a solvent like toluene containing 0.1% by weight of dibutyl tin dilaurate. This is then heated for 2 hours at 100–150° C.

The poly-hydroxy compound is dissolved in a solvent (miscible with that used to dissolve the reactants in the step just described) such as dimethylformamide or ethylene glycol dimethyl ether. This solution is added to the solution of modified polyester and the mixture is then refluxed for from 1 to 8 hours.

The resulting polymer can be isolated by stripping off the solvent under reduced pressure.

Preparation of the dispersions

The dispersions of the invention can be prepared by dissolving from 0.001 to about 2 grams of the material of Formula 1 per square meter[1] of surface area of the particles to be used, preferably 0.004 to about 0.100 gram per square meter, in an organic liquid. If the dispersion is to be made into a paint, this organic liquid must be compatible with the other ingredients.

Illustrative of organic liquids which can be used are aliphatic and aromatic hydrocarbons, ethers, esters, ketones, alcohols and mixtures of these.

An appropriate amount of the particulate material is then added to this solution, which is then subjected to high shear, as by sand grinding, ball milling or roller milling to deagglomerate and disperse the particles.

Alternatively, the dispersions may be prepared by premixing the material of Formula 1, particulate matter and liquid in a vessel and then grinding the mixture under high shear.

Dispersions of magnetic oxides used for preparing magnetic tape can be made by first preparing a slurry of magnetic oxide in a small amount of a solution of binder resin and deflocculating agent in an organic liquid such as cyclohexanone, methylethyl ketone, methylisobutyl ketone, toluene, dioxane or tetrahydrofuran. This slurry is then ball-milled for 24–48 hours. To the slurry is then added the remainder of the binder resin, solvent and such lubricants, curing agents or other adjuncts as are desired. The resulting dispersion is ball milled for 2–4 hours and is then ready for use.

These dispersions can then be applied to conventional tape usually made of cellulose acetate or Mylar® polyester film,[2] in the customary way, and then cured, usually by baking for a short period.

---

[1] Measured by the Brunauer, Emmett and Teller nitrogen adsorption method described on page 30 of "Colloidal Dispersions" by Earl K. Fischer, published by John Wiley and Sons in 1950.

[2] E. I. du Pont de Nemours and Company. The preferred film is that described in U.S.P. 3,397,072.

PREFERRED EMBODIMENTS OF THE INVENTION

The following examples are submitted so that the invention may be more readily understood and practiced.

Those skilled in the art will no doubt be able to compose numerous variations on their central theme. It is naturally considered that these variations are a part of the invention.

In the examples all parts are by weight unless otherwise indicated.

Example 1

Thirty parts of hydroxy-terminated polycaprolactone (molecular weight 3000) dissolved in 70 parts of toluene were added to 1.7 parts of 2,4-toluene diisocyanate and 0.5 part of dibutyl tin dilaurate at 120° C. over a period of two hours. The mixture was refluxed (120° C.) for ½ hour after addition was complete.

The mixture was then added to 340 parts of anhydrous dimethylformamide containing 85 parts of dipentaerythritol and heated one hour at 120° C. The solvent was stripped at 100° C. and 20 mm. of pressure, leaving behind a solid residue. This was washed several times with boiling water to remove unreacted dipentaerythritol.

The washed product was then dissolved in 350 parts of benzene and azeotroped to eliminate water.

The resulting solution was stripped of solvent at 100° C. and 20 mm. of pressure to give a polymer having the structure

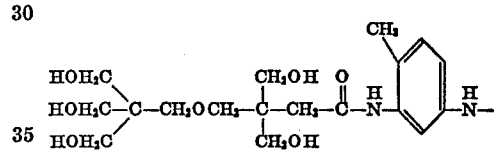

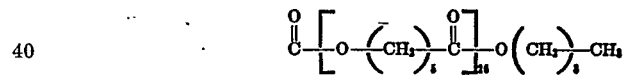

A dispersion of quinacridone pigment (Monastral tape usually made of cellulose acetate or Mylar® polypigment, violet R RT-795-1)[3] was made by adding six parts of the pigment to a solution of 1 part of polymer in 13 parts of toluene. Twenty parts of Ottawa sand was added and the mixture shaken on a paint shaker for 30 minutes. The sand was separated by filtration to give a dispersion highly resistant to flocculation.

Three and three-tenths parts of this dispersion were added to a solution of a mixture of 6.8 parts of melamine/formaldehyde condensate and 9.35 parts of styrene/acrylic acid (61.2/10.7) copolymer reacted with glycidyl versatate (28.1) in a mixture of 7.1 parts of butanol, 62.3 parts of xylene and 3.7 parts of VMP naphtha.

A film cast from this paint and baked 3 minutes at 163° C. was transparent, solvent resistant and had unusually high gloss.

Example 2

On hundred fifty parts of 12-hydroxystearic acid, 3.25 parts of 2-ethylhexyl alcohol, 10 parts of xylene and 1 part of p-toluenesulfonic acid were charged to a reactor. The reaction mixture was heated to reflux and xylene distilled off until the flask contents reached 175° C. The mixture was then refluxed at 175° C. for 8 hours, while 8.5 parts of water were collected.

The mixture was cooled to room temperature and 150 parts of ethylene glycol dimethyl ether, 4.35 parts of 2,4-toluene diisocyanate and 0.1 part dibutyl tin dilaurate were added. This mixture was heated for three hours at

---

[3] E. I. du Pont de Nemours and Company.

100° C., and then 6.35 parts of dipentaerythritol were added and the mixture heated another three hours.

The product, a sticky resin, was isolated by stripping off solvent at 100° C. and 20 mm. of pressure. It had the structure

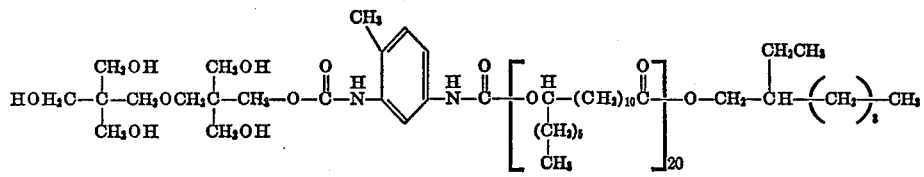

Equivalent amounts of this polymer can be substituted for the polymer product of Example 1 and made into a paint, as shown in Example 1, with satisfactory results.

I claim:
1. A dispersion comprising
   (A) an organic liquid selected from the group consisting of aliphatic and aromatic hydrocarbons, ethers, esters, ketones, alcohols and mixtures of these;
   (B) particles dispersed in the liquid; and
   (C) as an anti-flocculating agent, molecules of a polymeric material of the formula

$$AZ{-}[OXC(O){-}]_n OD$$

where
A is

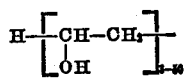

or

Z is a dicarbamate radical;

X is an alkylene radical of 2 through 18 carbon atoms;
D is hydrogen or an alkyl radical of 1 through 18 carbon atoms; and
$n$ is a number 10 through 500.

2. The dispersion of claim 1 wherein the material in (C) has the structure

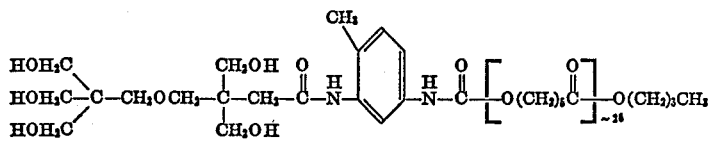

3. The dispersion of claim 1 wherein the material in (C) has the structure

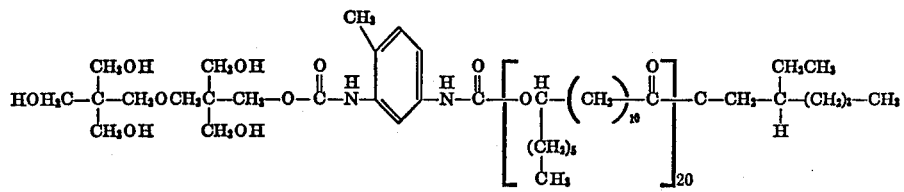

4. The dispersion of claim 1 wherein the particles in (B) are pigment particles.
5. The dispersion of claim 2 wherein the particles in (B) are pigment particles.
6. The dispersion of claim 3 wherein the particles in (B) are pigment particles.
7. The dispersion of claim 1 wherein the particles in (B) are polymer particles.
8. The dispersion of claim 2 wherein the particles in (B) are polymer particles.
9. The dispersion of claim 3 wherein the particles in (B) are polymer particles.
10. The dispersion of claim 1 wherein the particles in (B) are magnetic oxide particles.
11. The dispersion of claim 2 wherein the particles in (B) are magnetic oxide particles.
12. The dispersion of claim 3 wherein the particles in (B) are magnetic oxide particles.

References Cited
UNITED STATES PATENTS

| | | | |
|---|---|---|---|
| 3,166,524 | 1/1965 | Schmidle et al. | 260—23 |
| 3,317,635 | 5/1967 | Osmond | 260—34.2 |
| 3,382,297 | 5/1968 | Thompson | 260—875 |
| 3,393,162 | 7/1968 | Cox et al. | 260—4 |
| 3,405,087 | 10/1968 | Fryd | 260—34.2 |
| 3,411,944 | 11/1968 | Higashi | 252—62.54 |
| 3,433,753 | 3/1969 | Farkas | 260—22 |
| 3,505,268 | 4/1970 | Backhouse et al. | 260—31.2 |
| 3,514,500 | 5/1970 | Osmond et al. | 260—874 |
| 3,532,662 | 10/1970 | Ansdell | 260—34.2 |

DANIEL E. WYMAN, Primary Examiner
A. P. DEMERS, Assistant Examiner

U.S. Cl. X.R.

260—29.1 R, 3.12 N, 31.2 R, 32.8 R, 32.8 N, 33.2 R, 33.4 F, 33.4 Q, 33.6 F, 33.6 PQ, 33.6 R, 33.6 OA, 37 N, 37 R